US012752844B2

(12) United States Patent
Agrawal et al.

(10) Patent No.: US 12,752,844 B2
(45) Date of Patent: Oct. 6, 2026

(54) VARIABLE WHEEL SPEED CONTROL OF DIFFERENTIAL HYDRAULIC DRIVE HARVESTER IMPLEMENT

(71) Applicant: DEERE & COMPANY, Moline, IL (US)

(72) Inventors: Mahi Agrawal, Pune (IN); Sameer Gorivale, Pune (IN)

(73) Assignee: Moline, Illinois, Moline, IL (US)

(*) Notice: Subject to any disclaimer, the term of this patent is extended or adjusted under 35 U.S.C. 154(b) by 294 days.

(21) Appl. No.: 18/761,372

(22) Filed: Jul. 2, 2024

(65) Prior Publication Data

US 2026/0008498 A1 Jan. 8, 2026

(51) Int. Cl.
*B62D 11/04* (2006.01)

(52) U.S. Cl.
CPC .................................... *B62D 11/04* (2013.01)

(58) Field of Classification Search
CPC ....................................................... B62D 11/04
See application file for complete search history.

(56) References Cited

U.S. PATENT DOCUMENTS 6,148,939 A * 11/2000 Brookhart ............ B62D 11/183 180/6.48
11,365,801 B2 * 6/2022 Knutson ................ B62D 5/065
11,518,434 B2 12/2022 Rotole et al.
2021/0129903 A1 5/2021 Rotole et al.
2022/0124972 A1 4/2022 Dai et al.

OTHER PUBLICATIONS

Extended European Search Report and Written Opinion issued in European Patent Application No. 25180761.6 dated Nov. 19, 2025, in 09 pages.

* cited by examiner

*Primary Examiner* — Kevin Hurley

(57) ABSTRACT

An implement includes a steering input operable to receive a desired vehicle steering command and a differential hydraulic drive system. A drive controller determines an acceleration rate of the steering input while receiving the desired vehicle steering command and defines a left acceleration rate and a right acceleration for a left hydraulic drive system and a right hydraulic drive system respectively based on the acceleration rate of the steering input while receiving the desired vehicle steering command. The drive controller communicates the left acceleration rate and the right acceleration rate to the differential hydraulic drive system to achieve the desired vehicle steering command.

20 Claims, 3 Drawing Sheets

VARIABLE WHEEL SPEED CONTROL OF DIFFERENTIAL HYDRAULIC DRIVE HARVESTER IMPLEMENT

TECHNICAL FIELD

The disclosure generally relates to an implement having a differential hydraulic drive system for both propulsion and steering, and a method of controlling the implement.

BACKGROUND

In some vehicles, including but not limited to agricultural crop harvesting implements, a set of drive wheels may be mounted in a fixed, forward facing orientation. In some implementations, the drive wheels may include the forward or front wheels of the implement. The implement may include a differential drive system coupled to the set of drive wheels, e.g., the front wheels of the implement. In such a configuration, the front wheels are not free to turn left or right about a respective vertical axis to turn the vehicle. Rather, the vehicle is propelled by driving or rotating the front drive wheels and may be steered by driving or rotating the front drive wheels at different rotational speeds from each other. The vehicle may further include a rear set of wheels. Often, the rear set of wheels are mounted on casters. In some implementations, the rear set of wheels may be free to rotate about respective vertical axes, and do not contribute to steering of the vehicle. In other implementations, the rear wheels may be controlled to provide a steering effect.

Steering and vehicle speed changes of such implements may be achieved either manually, in which an operator provides a desired vehicle steering command or a desired vehicle speed command, or autonomously, in which a drive controller, e.g., a computer, controls the differential drive system of the implement to follow a defined path, direction, route, etc. When manually executing a minor steering maneuver at high speed, a slow and short steering input may be applied, whereas when executing an extreme turn in a tight space, e.g., a one hundred eighty degree turn, a quick and large steering input may be applied. The speed at which the implement executes these different maneuvers, i.e., the speed at which the implement changes the velocity of the respective wheels to execute these maneuvers is constant. In other words, the implement controls the differential drive system in the same manner whether executing a slow short steering input, or a quick large steering input. This vehicle response may be challenging to some operators.

SUMMARY

An implement, such as but not limited to a self-propelled windrower implement, is provided. The implement includes a steering input that is operable to receive a desired vehicle steering command. A differential drive system has a left drive system operable to rotate a left ground engaging element at a first rotational speed, and a right drive system operable to rotate a right ground engaging element at a second rotational speed. A steering input acceleration sensor is operable to detect data related to an acceleration rate of the steering input. A drive controller includes a processor and a memory having a drive control algorithm stored thereon. The processor is operable to execute the drive control algorithm to determine an acceleration rate of the steering input while receiving the desired vehicle steering command, from data detected by the steering input acceleration sensor. The drive controller may then define a left acceleration rate for the left drive system to change a velocity of the left ground engaging element from an initial left-side velocity to a commanded left-side velocity for achieving the desired vehicle steering command. The left acceleration rate is defined based on the acceleration rate of the steering input while receiving the desired vehicle steering command. The drive controller may further define a right acceleration rate for the right drive system to change a velocity of the right ground engaging element from an initial right-side velocity to a commanded right-side velocity for achieving the desired vehicle steering command. The right acceleration rate is defined based on the acceleration rate of the steering input while receiving the desired vehicle steering command. The drive controller may then communicate a left control signal to the left drive system commanding the left acceleration rate, and communicate a right control signal to the right drive system commanding the right acceleration rate, to achieve the desired vehicle steering command.

In one aspect of the disclosure, the left drive system may include a left pump and a left variable displacement hydraulic motor. Similarly, the right drive system may include a right pump and a right variable displacement hydraulic motor. In one implementation, the left pump and the right pump may each include a fixed displacement pump. In another implementation, the left pump and the right pump may each include a variable displacement pump.

In one aspect of the disclosure, the left acceleration rate for the left drive system and the right acceleration rate for the right drive system change in a direct relationship relative to the acceleration rate of the steering input. In other words, the left acceleration rate for the left drive system and the right acceleration rate for the right drive system increase as the acceleration rate of the steering input increases. Similarly, the left acceleration rate for the left drive system and the right acceleration rate for the right drive system decrease as the acceleration rate of the steering input decreases. As such, when the desired vehicle steering command is applied to the steering input quickly, i.e., with a high or fast acceleration rate of the steering input, then the left acceleration rate and the right acceleration rate will be defined to include a higher value then when the desired steering command is applied to the steering input slowly, i.e., with a low or slow acceleration rate of the steering input.

The left acceleration rate for the left drive system and the right acceleration rate of the right drive system affects and/or controls how quickly the desired vehicle steering command is executed. As such, when the desired vehicle steering command is entered quickly, i.e., a high acceleration rate of the steering input, then the differential drive system is controlled to execute the desired vehicle steering command quickly via a higher left acceleration rate and a higher right acceleration rate, whereas when the desired vehicle steering command is entered slowly, i.e., a low accelerate rate of the steering input, then the differential drive system is controlled to execute the desired vehicle steering command slowly. As such, the change between the initial velocity and the commanded velocity for each of the left drive system and the right drive system is not linear. Instead, the change between the initial velocity and the commanded velocity for each of the left drive system and the right drive system is variable based on the speed at which the desired vehicle steering command was entered into the steering input, i.e., the acceleration rate of the steering input while receiving the desired vehicle steering command.

In one aspect of the disclosure, the processor may be operable to execute the drive control algorithm to define the left acceleration rate for the left drive system and the right acceleration rate for the right drive system to each be between a minimum allowable acceleration rate and a maximum allowable acceleration rate.

In one aspect of the disclosure, the processor may be operable to execute the drive control algorithm to receive a user defined turn gain preference. The user defined turn gain preference may include and/or define a user desired adjustment to the left acceleration rate and the right acceleration rate defined by the drive controller, thereby allowing user adjustability of the speed at which the implement executes the steering maneuver. For example, the processor may be operable to execute the drive control algorithm to adjust the left acceleration rate for the left drive system and adjust the right acceleration rate for the right drive system based on the user defined turn gain preference when controlling the differential drive system to achieve the desired vehicle turn command.

In one implementation of the disclosure, the implement may include a propulsion input operable to receive a desired vehicle speed command, and a propulsion input acceleration sensor operable to detect data related to an acceleration rate of the propulsion input.

In one aspect of the disclosure, the processor may be operable to execute the drive control algorithm to determine an acceleration rate of the propulsion input while receiving the desired vehicle speed command, from data detected by the propulsion input acceleration sensor. The drive controller may then define the left acceleration rate for the left drive system to change the velocity of the left ground engaging element from the initial left-side velocity to the commanded left-side velocity for achieving the desired vehicle speed command. The left acceleration rate is defined based on the acceleration rate of the propulsion input while receiving the desired vehicle speed command. The drive controller may further define the right acceleration rate for the right drive system to change the velocity of the right ground engaging element from the initial right-side velocity to the commanded right-side velocity for achieving the desired vehicle speed command. The right acceleration rate is defined based on the acceleration rate of the propulsion input while receiving the desired vehicle speed command.

In one aspect of the disclosure, the left acceleration rate for the left drive system and the right acceleration rate for the right drive system change in a direct relationship relative to the acceleration rate of the propulsion input. In other words, the left acceleration rate for the left drive system and the right acceleration rate for the right drive system increase as the acceleration rate of the propulsion input increases. Similarly, the left acceleration rate for the left drive system and the right acceleration rate for the right drive system decrease as the acceleration rate of the propulsion input decreases. As such, when the desired vehicle speed command is applied to the propulsion input quickly, i.e., with a high or fast acceleration rate of the propulsion input, then the left acceleration rate and the right acceleration rate will be defined to include a higher value then when the desired speed command is applied to the propulsion input slowly, i.e., with a low or slow acceleration rate of the propulsion input.

The left acceleration rate for the left drive system and the right acceleration rate of the right drive system affects and/or controls how quickly the desired vehicle speed command is executed. As such, when the desired vehicle speed command is entered quickly, i.e., a high acceleration rate of the propulsion input, then the differential drive system is controlled to execute the desired vehicle speed command quickly via a higher left acceleration rate and a higher right acceleration rate, whereas when the desired vehicle speed command is entered slowly, i.e., a low accelerate rate of the propulsion input, then the differential drive system is controlled to execute the desired vehicle speed command slowly. As such, the change between the initial velocity and the commanded velocity for each of the left drive system and the right drive system is not linear. Instead, the change between the initial velocity and the commanded velocity for each of the left drive system and the right drive system is variable based on the speed at which the desired vehicle speed command was entered into the propulsion input, i.e., the acceleration rate of the propulsion input while receiving the desired vehicle steering command.

In one implementation of the disclosure, the processor may be operable to execute the drive control algorithm to receive a user defined propulsion gain preference. The user defined propulsion gain preference may include and/or define a user desired adjustment to the left acceleration rate and the right acceleration rate defined by the drive controller, thereby allowing user adjustability of the speed at which the implement executes the change in speed request. For example, the processor may be operable to execute the drive control algorithm to adjust the left acceleration rate for the left drive system and adjust the right acceleration rate for the right drive system based on the user defined propulsion gain preference when controlling the differential drive system to achieve the desired vehicle speed command.

A method of controlling a differential drive system of an implement is also provided. The method includes determining with a drive controller one of an acceleration rate of a steering input while receiving a desired vehicle steering command, from data detected by a steering input acceleration sensor, or an acceleration rate of a propulsion input while receiving a desired vehicle speed command, from data detected by a propulsion input acceleration sensor. A left acceleration rate for the left drive system may then be defined with the drive controller to change a velocity of a left ground engaging element from an initial left-side velocity to a commanded left-side velocity for achieving one of the desired vehicle steering command or the desired vehicle speed command. The left acceleration rate is defined based on one of the acceleration rate of the steering input while receiving the desired vehicle steering command or the acceleration rate of the propulsion input while receiving the desired vehicle speed command. A right acceleration rate for the right drive system may then be defined with the drive controller to change a velocity of a right ground engaging element from an initial right-side velocity to a commanded right-side velocity for achieving one of the desired vehicle steering command or the desired vehicle speed command. The right acceleration rate is defined based on one of the acceleration rate of the steering input while receiving the desired vehicle steering command or the acceleration rate of the propulsion input while receiving the desired vehicle speed command. A left control signal is communicated to the left drive system with the drive controller to command the left acceleration rate, and a right control signal is communicated to the right drive system with the drive controller to command the right acceleration rate.

In one aspect of the disclosure, the method includes the drive controller receiving a user defined turn gain preference. The drive controller may then adjust the left acceleration rate for the left drive system and adjust the right acceleration rate for the right drive system based on the user defined turn gain preference when controlling the differential drive system to achieve the desired vehicle turn command.

In one aspect of the disclosure, the method may include the drive controller receiving a user defined propulsion gain preference. The drive controller may then adjust the left acceleration rate for the left drive system and adjust the right acceleration rate for the right drive system based on the user defined propulsion gain preference when controlling the differential drive system to achieve the desired vehicle speed command.

Accordingly, the implement and method described herein adjust the speed at which the implement changes speed or direction based on the speed at which either the steering input or the propulsion input are moved when receiving the desired vehicle steering command or the desired vehicle speed command respectively. As such, the implement's response to the requested action, i.e., the desired vehicle steering command and/or the desired vehicle speed command is variable based on the speed at which the steering input and/or the propulsion input are moved, i.e., the acceleration rate of the steering input or the acceleration rate of the propulsion input. As such, the change in wheel speed to achieve the desired maneuver is variable and tailored to the specific command application, thereby making operation of the implement easier and less challenging.

The above features and advantages and other features and advantages of the present teachings are readily apparent from the following detailed description of the best modes for carrying out the teachings when taken in connection with the accompanying drawings.

DETAILED DESCRIPTION

Figure 1:
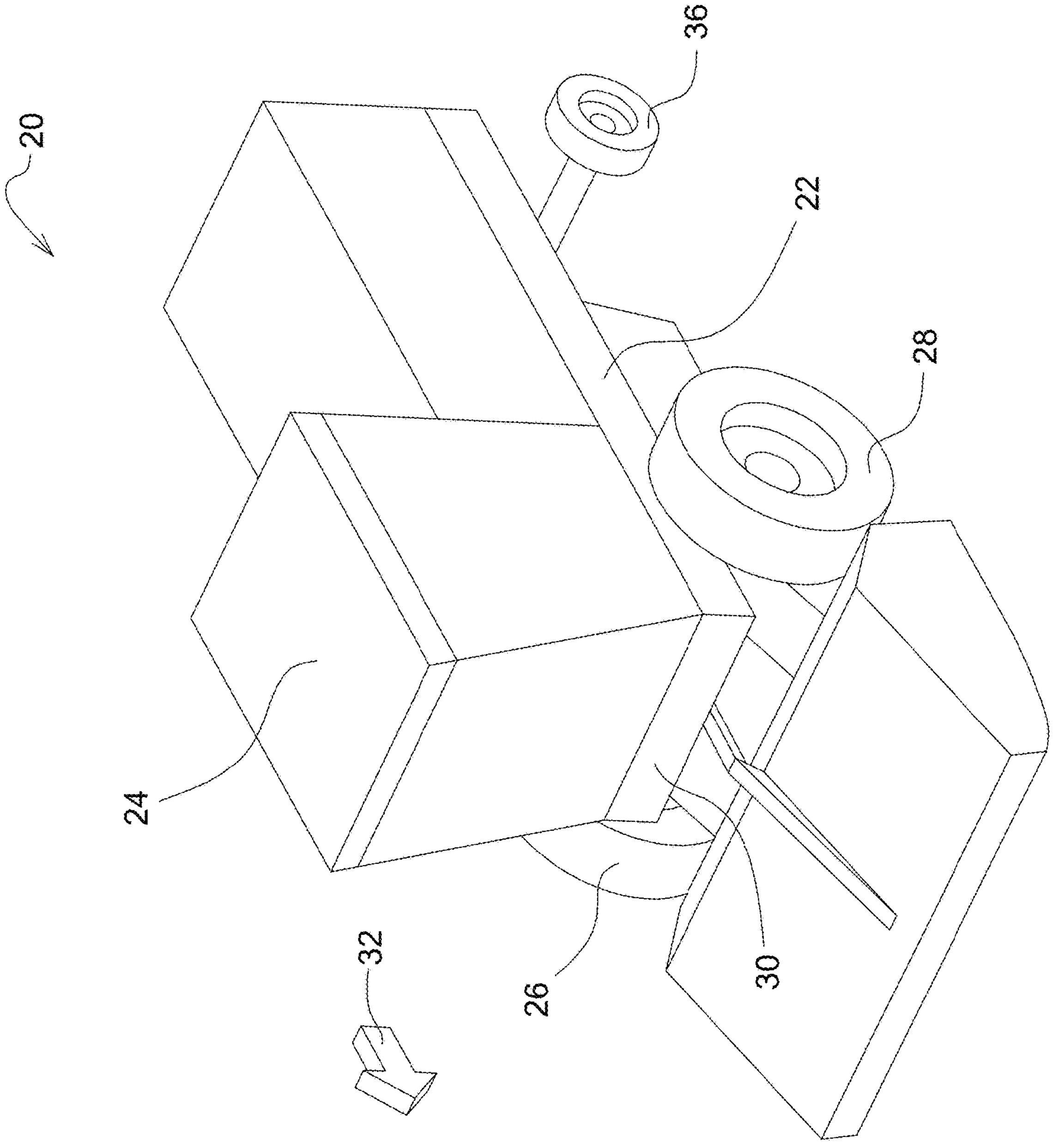
FIG. 1 is a schematic perspective view of a crop harvesting implement.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate corresponding parts throughout the several views, an exemplary implementation of a crop harvesting implement is generally shown at 20 in in the Figures. In the example implementation shown in FIGS. 1 and 2, the implement 20 is configured as a self-propelled windrower. However, it should be appreciated that the implement 20 may be configured differently, such as but not limited to a combine, lawn mower, or some other moveable platform having a differential drive system 46. Additionally, it should be appreciated that the different components and systems of the implement 20 described below may differ from the exemplary implementation of the implement 20 shown in the Figures and described herein.

Figure 2:
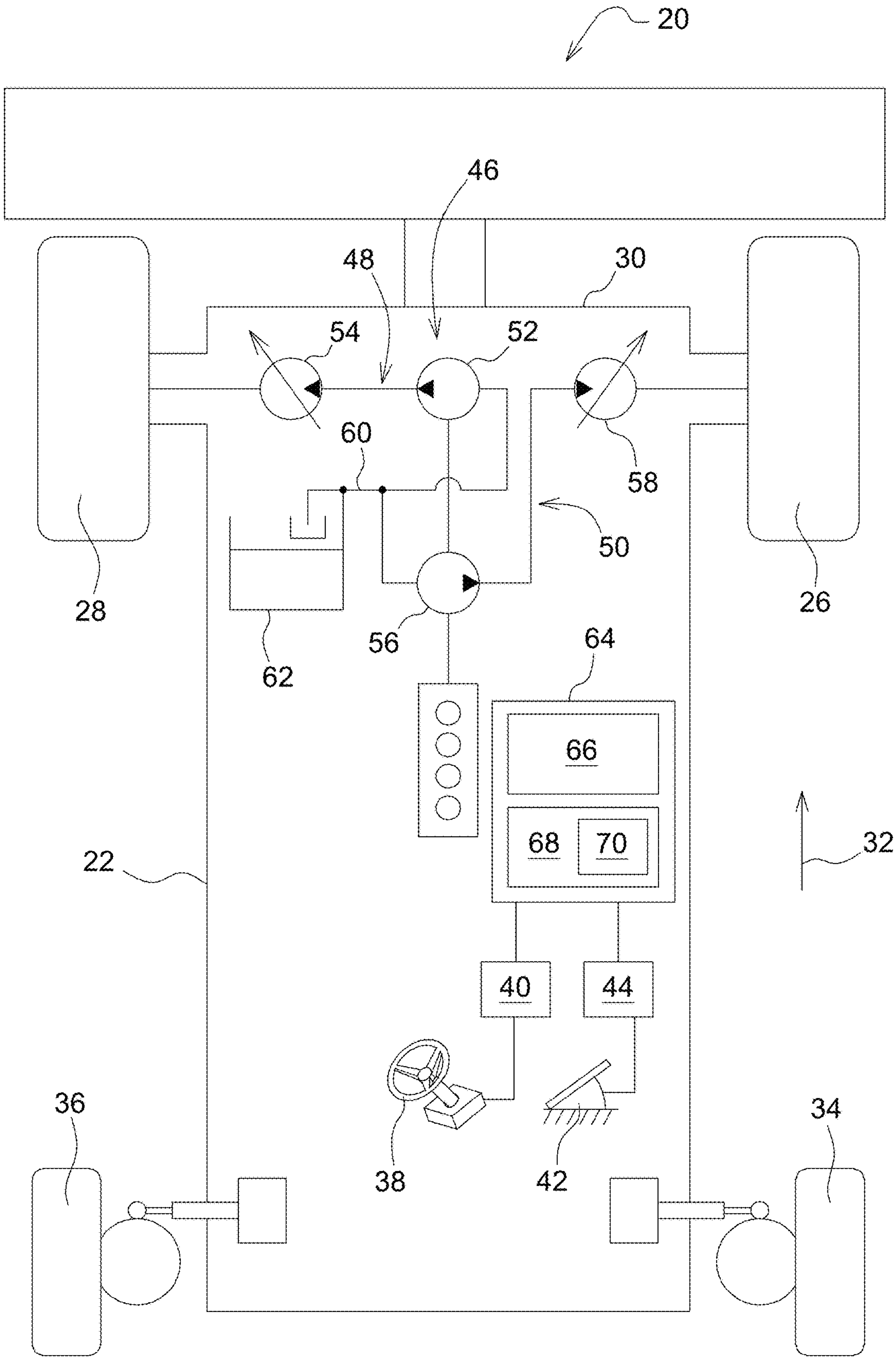
FIG. 2 is a schematic top view of the crop harvesting implement.

Referring to FIGS. 1 and 2, the implement 20 includes a frame 22, on which is supported an operator's station 24, from which an operator may control the implement 20. The operator's station 24 includes the various controls, displays, input devices, etc., necessary for the operator to control the implement 20. The frame 22 supports a right ground engaging element 26 and a left ground engaging element 28. In the example implementation, the right ground engaging element 26 and the left ground engaging element 28 are disposed proximate a forward end 30 of the implement 20 relative to a direction of travel 32 during harvest operations. However, in other implementations, the right ground engaging element 26 and the left ground engaging element 28 may be disposed proximate the rear of the implement 20 relative to the direction of travel 32 during operation. The right ground engaging element 26 and the left ground engaging element 28 may each include, but are not limited to, a tire/wheel combination, a track, or some other device capable of rotation relative to the frame 22 to propel the implement 20 along a ground surface. The right ground engaging element 26 and the left ground engaging element 28 may alternatively be referred to herein as the right front drive wheel 26 and the left front drive wheel 28 respectively. The right ground engaging element 26 and the left ground engaging element 28 are each fixed in a forward-facing orientation, such that the right ground engaging element 26 and the left ground engaging element 28 do not pivot about a respective vertical axis.

The example implementation shown in the Figures further includes a rear right wheel 34, and a rear left wheel 36. In the example implementation shown in the Figures, the rear right wheel 34 and the rear left wheel 36 are caster wheels rotatably attached to the frame 22, such that the rear right wheel 34 and the rear left wheel 36 are independently rotatable about respective vertical axes.

Referring to FIG. 2, the implement 20 includes a steering input 38 that is operable to receive a desired vehicle steering command from an operator. The operator uses the steering input 38 to enter the desired vehicle steering command. The steering input 38 may include, but is not limited to, a steering wheel, steering levers, a joystick, etc.

The implement 20 includes a steering input acceleration sensor 40 that is coupled to the steering input 38. The steering input acceleration sensor 40 is operable to detect acceleration of the steering input 38 while the desired vehicle steering command is entered into the steering input 38. The steering input acceleration sensor 40 generates and/or outputs a sensor signal indicative of the acceleration rate at which the desired vehicle steering command was entered into the steering input 38. The steering input acceleration sensor 40 may include any type and/or configuration of acceleration sensor suitable for detecting the acceleration of the steering input 38, and may be dependent upon the specific type of steering input 38 used. For example, the steering input acceleration sensor 40 may include but is not limited to, a piezoelectric accelerometer, a capacitive accelerometer, a piezoresistance accelerometer, an inductive accelerometer, a strain based accelerometer, a servo accelerometer, etc. The specific types and operation of the acceleration sensors are not pertinent to the teachings of this disclosure, are well known in the art, and are therefore not described in greater detail herein.

Referring to FIG. 2, the implement 20 includes a propulsion input 42 that is operable to receive a desired vehicle speed command from the operator. The operator uses the propulsion input 42 to enter the desired vehicle steering command. The propulsion input 42 may include, but is not limited to, a throttle pedal, a throttle lever, a touchscreen display, one or more buttons, etc. It should be appreciated that in some implementations, the steering input 38 and the propulsion input 42 may be combined, such as for example via a pair of wheel speed levers, i.e., a first lever controlling a left wheel speed and a second lever controlling a right wheel speed.

The implement 20 may further include a propulsion input acceleration sensor 44 that is coupled to the propulsion input 42. The propulsion input acceleration sensor 44 is operable to detect acceleration of the propulsion input 42 while the desired vehicle speed command is entered into the propulsion input 42. The propulsion input acceleration sensor 44 generates and/or outputs a sensor signal indicative of the acceleration rate at which the desired vehicle speed command was entered into the propulsion input 42. The propulsion input acceleration sensor 44 may include any type and/or configuration of acceleration sensor suitable for detecting the acceleration of the propulsion input 42, and may be dependent upon the specific type of propulsion input 42 used. For example, the propulsion input acceleration sensor 44 may include but is not limited to, a piezoelectric accelerometer, a capacitive accelerometer, a piezoresistance accelerometer, an inductive accelerometer, a strain based accelerometer, a servo accelerometer, etc. The specific types and operation of the acceleration sensors are not pertinent to the teachings of this disclosure, are well known in the art, and are therefore not described in greater detail herein.

As noted above, the implement 20 includes the differential drive system 46. In one implementation, the differential drive system 46 is a differential hydraulic drive system operable to convert fluid power into rotational movement. The differential drive system 46 includes a left drive system 48, e.g., a left hydraulic drive system, operable to rotate the left ground engaging element 28 at a first rotational speed, and a right drive system 50, e.g., a right hydraulic drive system, operable to rotate the right ground engaging element 26 at a second rotational speed. It should be appreciated that the teachings of this disclosure may apply to other types of drive systems, such as but not limited to an electrical drive system.

The second rotational speed may be different than the first rotational speed to turn the implement 20. When the right ground engaging element 26 and the left ground engaging element 28 are driven at the same rotational speed, i.e., the first rotational speed and the second rotational speed are equal, then the differential drive system 46 does not generate a steering effect on the implement 20, and instead propels the implement 20 along a linear path, e.g., forward or backward depending upon the direction of rotation of the right ground engaging element 26 and the left ground engaging element 28. When the right ground engaging element 26 and the left ground engaging element 28 are driven at different rotational speeds, i.e., the first rotational speed and the second rotational speed are not equal, then the differential drive system 46 generates a steering effect on the implement 20, either left or right depending upon the rotational speed difference between the right ground engaging element 26 and the left ground engaging element 28.

In the implementation shown in the Figures and described herein, with reference to FIG. 2, the left drive system 48 is a hydraulic drive system, and includes a left pump 52 and a left variable hydraulic motor 54. The left pump 52 may be configured as either a fixed displacement pump or a variable displacement pump. Similarly, the right drive system 50 is a hydraulic drive system, and includes a right pump 56 and a right variable hydraulic motor 58. The right pump 56 may be configured as either a fixed displacement pump or a variable displacement pump. As understood by those skilled in the art, a variable displacement motor may be controlled to provide a variable torque and a variable speed. As understood by those skilled in the art, a fixed displacement pump is operable to provide a pre-defined and fixed fluid flow rate, whereas a variable displacement pump is operable to provide a variable or adjustable fluid flow rate.

The differential hydraulic drive system described herein is operated via fluid pressure supplied by a fluid circuit 60. The fluid circuit 60 may include, but is not limited to, a tank 62 disposed in fluid communication with the left pump 52 and the right pump 56. As such, it should be appreciated that the left pump 52 and the right pump 56 draw hydraulic fluid from the tank 62, circulate the hydraulic fluid through the fluid circuit 60 to the left motor and the right motor respectively, and back to the tank 62 to complete the fluid circuit 60. It should be appreciated that the various hydraulic components and/or hydraulic systems of the implement 20 may be connected through lines and/or conduits that are not show or depicted in the Figures, nor specifically described herein.

As shown in FIG. 2, the implement 20 includes a drive controller 64. The drive controller 64 may alternatively be referred to as a controller, a module, a control module, a computer, a computing device, a control unit, etc. The drive controller 64 is configured to control the operation of a differential hydraulic drive system. The drive controller 64 may be configured to control other components and/or systems of the implement 20 as well.

The drive controller 64 is disposed in communication with the steering input acceleration sensor 40 for receiving the sensor signal that indicates the acceleration of the steering input 38 during input of the desired vehicle steering command. The drive controller 64 is further disposed in communication with the steering input acceleration sensor 40 for receiving the sensor signal that indicates the acceleration of the propulsion input 42 during input of the desired vehicle speed command. The drive controller 64 is operable to generate and communicate a left control signal to the left drive system 48 and a right control signal to the right drive system 50. While the drive controller 64 is generally described herein as a singular device, it should be appreciated that the drive controller 64 may include multiple devices linked together to share and/or communicate information therebetween.

The drive controller 64 may alternatively be referred to as a computing device, a computer, a controller, a control unit, a control module, a module, etc. The drive controller 64 includes a processor 66, a memory 68, and all software, hardware, algorithms, connections, sensors, etc., necessary to manage and control the operation of the differential drive system 46. As such, a method may be embodied as a program or algorithm operable on the drive controller 64. It should be appreciated that the drive controller 64 may include any device capable of analyzing data from various sensors, comparing data, making decisions, and executing the required tasks.

As used herein, "controller" is intended to be used consistent with how the term is used by a person of skill in the art, and refers to a computing component with processing, memory 68, and communication capabilities, which is utilized to execute instructions (i.e., stored on the memory 68 or received via the communication capabilities) to control or communicate with one or more other components. In certain embodiments, the drive controller 64 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The drive controller 64 may be in communication with other components on the implement 20, such as hydraulic components, electrical components, and operator inputs within the operator's station 24. The drive controller 64 may be electrically connected to these other components by a wiring harness such that messages, commands, and electrical power may be transmitted between the drive controller 64 and the other components. Although the drive controller 64 is referenced in the singular, in alternative embodiments the configuration and functionality described herein can be split across multiple devices using techniques known to a person of ordinary skill in the art.

The drive controller 64 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 68 may include any non-transitory/tangible medium which participates in providing data or computer-readable instructions. The memory 68 may be non-volatile or volatile. Non-volatile media may include, for example, optical or magnetic disks and other persistent memory. Example volatile media may include dynamic random access memory (DRAM), which may constitute a main memory. Other examples of embodiments for memory 68 include a floppy, flexible disk, or hard disk, magnetic tape or other magnetic medium, a CD-ROM, DVD, and/or any other optical medium, as well as other possible memory devices such as flash memory.

The drive controller 64 includes the tangible, non-transitory memory 68 on which are recorded computer-executable instructions, including a drive control algorithm 70. The processor 66 of the drive controller 64 is configured for executing the drive control algorithm 70. The drive control algorithm 70 implements a method of controlling the differential drive system 46 of the implement 20, described in detail below.

Figure 3:
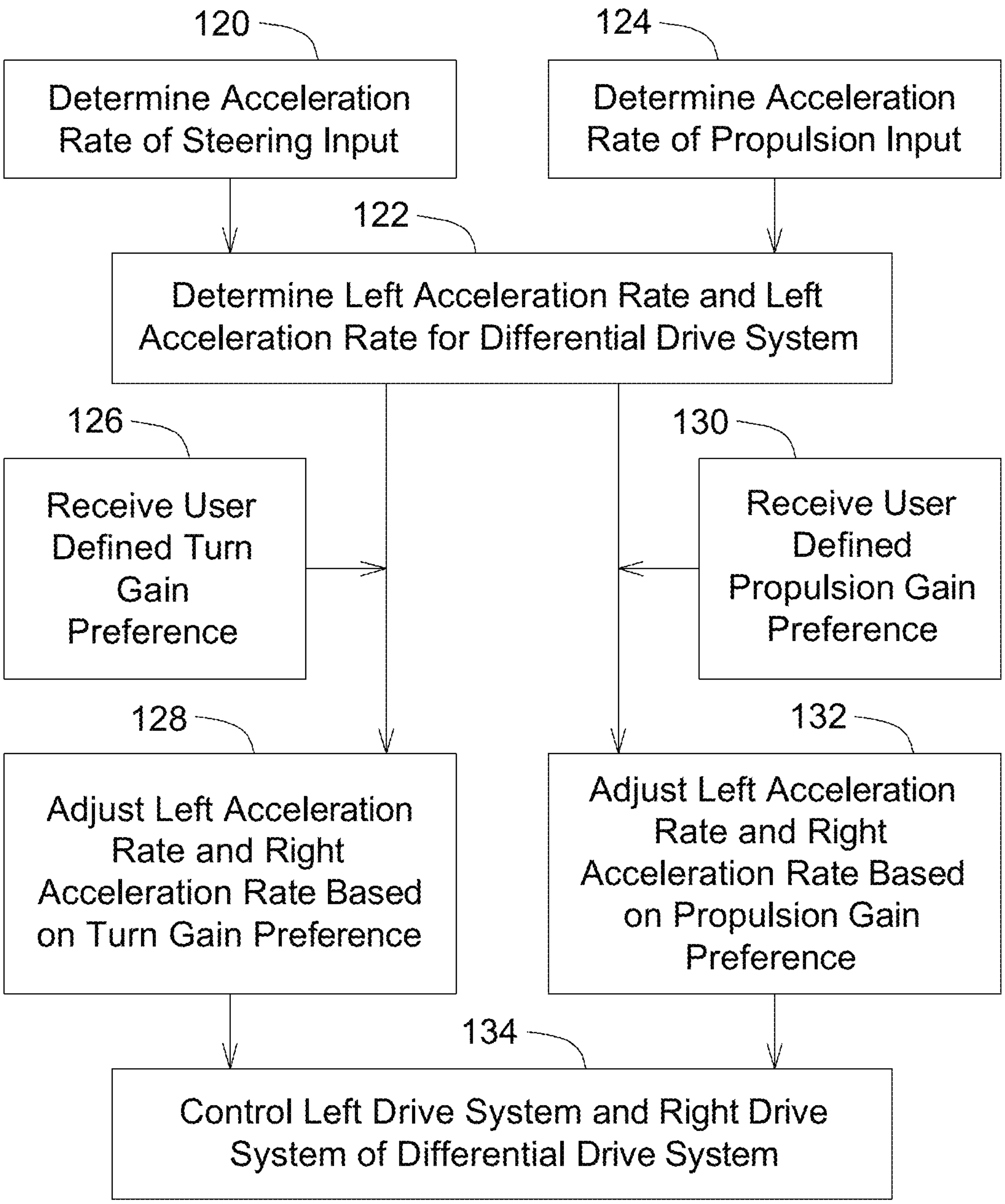
FIG. 3 is a flowchart representing a method of controlling the crop harvesting implement.

The method of controlling the differential drive system 46 described herein includes the drive controller 64 determining an acceleration rate of the steering input 38 while receiving the desired vehicle steering command. The step of determining the acceleration rate of the steering input 38 is generally indicated by box 120 shown in FIG. 3. The drive controller 64 may determine the acceleration rate of the steering input 38 from data detected by the steering input acceleration sensor 40. It should be appreciated that the acceleration rate of the steering input 38 is the change in speed over time experienced by the steering input 38 as the operator enters the desired vehicle steering command. The manner/process in which the drive controller 64 may determine the acceleration of the steering input 38 from the data sensed by the steering input acceleration sensor 40 is understood by those skilled in the art, and is therefore not described in greater detail herein.

Once the acceleration rate of the steering input 38 is determined, the drive controller 64 may then define a left acceleration rate and a right acceleration rate for the differential rive system 46. The step of defining the left acceleration rate and the right acceleration rate is generally indicated by box 122 shown in FIG. 3. The drive controller 64 defines the left acceleration rate for the left drive system 48 to change a velocity of the left ground engaging element 28 from an initial left-side velocity to a commanded left-side velocity. The change from the initial left-side velocity to the commanded left-side velocity of the left ground engaging element 28 is operable to achieve and/or effectuate the desired vehicle steering command. The initial left-side velocity of the left ground engaging element 28 may be considered the current velocity of the left ground engaging element 28 immediately prior to the operator entering the desired vehicle steering command. The commanded left-side velocity of the left ground engaging element 28 is the velocity of the left ground engaging element 28 necessary to achieve the desired vehicle steering command. The left acceleration rate of the left drive system 48 is the change in speed over time at which the left drive system 48 changes from the initial left-side velocity to the commanded left-side velocity.

The left acceleration rate is defined based on the acceleration rate of the steering input 38 while receiving the desired vehicle steering command. As such, the left acceleration rate is not a fixed value, but is instead a variable acceleration rate. The left acceleration rate for the left drive system 48 changes in a direct relationship relative to the acceleration rate of the steering input 38. In other words, the left acceleration rate for the left drive system 48 increases as the determined acceleration rate of the steering input 38 increases. As such, the left acceleration rate for the left drive system 48 is defined to have a higher value as the acceleration rate of the steering input 38 increases. In contrast, the left acceleration rate of the left drive system 48 is defined to have a lower value as the acceleration rate of the steering input 38 decreases. The variable relationship between the left acceleration rate relative to the acceleration rate of the steering input 38 may be, for example, defined in a look-up table or mathematical equation, which is saved on the memory 68 of the drive controller 64.

Once the acceleration rate of the steering input 38 is determined, the drive controller 64 may then define the right acceleration rate for the right drive system 50 to change a velocity of the right ground engaging element 26 from an initial right-side velocity to a commanded right-side velocity. The change from the initial right-side velocity to the commanded right-side velocity of the right ground engaging element 26 is operable to achieve and/or effectuate the desired vehicle steering command. The initial right-side velocity of the right ground engaging element 26 may be considered the current velocity of the right ground engaging element 26 immediately prior to the operator entering the desired vehicle steering command. The commanded right-side velocity of the right ground engaging element 26 is the velocity of the right ground engaging element 26 necessary to achieve the desired vehicle steering command. The right acceleration rate of the right drive system 50 is the change in speed over time at which the right drive system 50 changes from the initial right-side velocity to the commanded right-side velocity.

The right acceleration rate is defined based on the acceleration rate of the steering input 38 while receiving the desired vehicle steering command. As such, the right acceleration rate is not a fixed value, but is instead a variable acceleration rate. The right acceleration rate for the right drive system 50 changes in a direct relationship relative to the acceleration rate of the steering input 38. In other words, the right acceleration rate for the right drive system 50 increases as the determined acceleration rate of the steering input 38 increases. As such, the right acceleration rate for the right drive system 50 is defined to have a higher value as the acceleration rate of the steering input 38 increases. In contrast, the right acceleration rate of the right drive system 50 is defined to have a lower value as the acceleration rate of the steering input 38 decreases. The variable relationship between the right acceleration rate relative to the acceleration rate of the steering input 38 may be, for example, defined in a look-up table or mathematical equation, which is saved on the memory 68 of the drive controller 64.

The drive controller 64 may define the left acceleration rate for the left hydraulic drive system and the right acceleration rate for the right hydraulic drive system to each be between a minimum allowable acceleration rate and a maximum allowable acceleration rate. Because the drive controller 64 does not apply a fixed acceleration rate for all desired vehicle steering commands, the drive controller 64 may limit the lower and upper bounds of the left acceleration rate for the left drive system 48 and the right acceleration rate of the right drive system 50. The minimum allowable acceleration rate may be considered the lowest possible acceleration rate to which the drive controller 64 may define the left acceleration rate and the right acceleration rate. The maximum allowable acceleration rate may be considered the highest possible acceleration rate to which the drive controller 64 may define the left acceleration rate and the right acceleration rate. As such, it should be appreciated that the left acceleration rate and the right acceleration rate are defined to include values between the minimum allowable acceleration rate and the maximum allowable acceleration rate.

The method of controlling the differential drive system 46 described herein includes the drive controller 64 determining an acceleration rate of the propulsion input 42 while receiving the desired vehicle speed command. The step of determining the acceleration rate of the propulsion input 42 is generally indicated by box 124 shown in FIG. 3. The drive controller 64 may determine the acceleration rate of the propulsion input 42 from data detected by the propulsion input acceleration sensor 44. It should be appreciated that the acceleration rate of the propulsion input 42 is the change in speed over time experienced by the propulsion input 42 as the operator enters the desired vehicle speed command. The manner/process in which the drive controller 64 may determine the acceleration of the propulsion input 42 from the data sensed by the propulsion input acceleration sensor 44 is understood by those skilled in the art, and is therefore not described in greater detail herein.

Once the acceleration rate of the propulsion input 42 is determined, the drive controller 64 may then define the left acceleration rate for the left drive system 48 to change the velocity of the left ground engaging element 28 from the initial left-side velocity to the commanded left-side velocity. The change from the initial left-side velocity to the commanded left-side velocity of the left ground engaging element 28 is operable to achieve and/or effectuate the desired vehicle speed command. The initial left-side velocity of the left ground engaging element 28 may be considered the current velocity of the left ground engaging element 28 immediately prior to the operator entering the desired vehicle speed command. The commanded left-side velocity of the left ground engaging element 28 is the velocity of the left ground engaging element 28 necessary to achieve the desired vehicle speed command. The left acceleration rate of the left drive system 48 is the change in speed over time at which the left drive system 48 changes from the initial left-side velocity to the commanded left-side velocity.

The left acceleration rate is defined based on the acceleration rate of the propulsion input 42 while receiving the desired vehicle speed command. As such, the left acceleration rate is not a fixed value, but is instead a variable acceleration rate. The left acceleration rate for the left drive system 48 changes in a direct relationship relative to the acceleration rate of the propulsion input 42. In other words, the left acceleration rate for the left drive system 48 increases as the determined acceleration rate of the propulsion input 42 increases. As such, the left acceleration rate for the left drive system 48 is defined to have a higher value as the acceleration rate of the propulsion input 42 increases. In contrast, the left acceleration rate of the left drive system 48 is defined to have a lower value as the acceleration rate of the propulsion input 42 decreases. The variable relationship between the left acceleration rate relative to the acceleration rate of the propulsion input 42 may be, for example, defined in a look-up table or mathematical equation, which is saved on the memory 68 of the drive controller 64.

Once the acceleration rate of the propulsion input 42 is determined, the drive controller 64 may then define the right acceleration rate for the right drive system 50 to change the velocity of the right ground engaging element 26 from the initial right-side velocity to the commanded right-side velocity. The change from the initial right-side velocity to the commanded right-side velocity of the right ground engaging element 26 is operable to achieve and/or effectuate the desired vehicle speed command. The initial right-side velocity of the right ground engaging element 26 may be considered the current velocity of the right ground engaging element 26 immediately prior to the operator entering the desired vehicle speed command. The commanded right-side velocity of the right ground engaging element 26 is the velocity of the right ground engaging element 26 necessary to achieve the desired vehicle speed command. The right acceleration rate of the right drive system 50 is the change in speed over time at which the right drive system 50 changes from the initial right-side velocity to the commanded right-side velocity.

The right acceleration rate is defined based on the acceleration rate of the propulsion input 42 while receiving the desired vehicle speed command. As such, the right acceleration rate is not a fixed value, but is instead a variable acceleration rate. The right acceleration rate for the right drive system 50 changes in a direct relationship relative to the acceleration rate of the propulsion input 42. In other words, the right acceleration rate for the right drive system 50 increases as the determined acceleration rate of the propulsion input 42 increases. As such, the right acceleration rate for the right drive system 50 is defined to have a higher value as the acceleration rate of the propulsion input 42 increases. In contrast, the right acceleration rate of the right drive system 50 is defined to have a lower value as the acceleration rate of the propulsion input 42 decreases. The variable relationship between the right acceleration rate relative to the acceleration rate of the propulsion input 42 may be, for example, defined in a look-up table or mathematical equation, which is saved on the memory 68 of the drive controller 64.

In one aspect of the disclosure, the drive controller 64 may be configured to receive a user defined turn gain preference. The step of receiving the user defined turn gain preference is generally indicated by box 126 shown in FIG. 3. The user defined turn gain preference may include a user defined setting that increases or decreases the defined left acceleration rate of the left drive system 48 and the right acceleration rate for the right drive system 50, based on the operator's desired responsiveness for the differential drive system 46 when turning the implement 20. As such, the user defined turn gain preference may be defined to increase the defined left acceleration rate of the left drive system 48 and the right acceleration rate for the right drive system 50 if the operator wants a quicker response from the differential drive system 46 when turning the implement 20. In contrast, the user defined turn gain preference may be defined to decrease the defined left acceleration rate of the left drive system 48 and the right acceleration rate for the right drive system 50 if the operator wants a slower response from the differential drive system 46 when turning the implement 20. If the user defined turn gain preference is selected and defined by the operator, the drive controller 64 may adjust the left acceleration rate for the left drive system 48 and the right acceleration rate for the right drive system 50 based on the user defined turn gain preference when controlling the differential drive system 46 to achieve the desired vehicle turn command. The step of adjusting the left acceleration rate and the right acceleration rate based on the user defined turn gain preference is generally indicated by box 128 shown in FIG. 3.

In one aspect of the disclosure, the drive controller 64 may be configured to receive a user defined propulsion gain preference. The step of receiving the user defined propulsion gain preference is generally indicated by box 130 shown in FIG. 3. The user defined propulsion gain preference may include a user defined setting that increases or decreases the defined left acceleration rate of the left drive system 48 and the right acceleration rate for the right drive system 50, based on the operator's desired responsiveness for the differential drive system 46 when accelerating the implement 20. As such, the user defined propulsion gain preference may be defined to increase the defined left acceleration rate of the left drive system 48 and the right acceleration rate for the right drive system 50 if the operator wants a quicker response from the differential drive system 46 when accelerating the implement 20. In contrast, the user defined propulsion gain preference may be defined to decrease the defined left acceleration rate of the left drive system 48 and the right acceleration rate for the right drive system 50 if the operator wants a slower response from the differential drive system 46 when accelerating the implement 20. If the user defined propulsion gain preference is selected and defined by the operator, the drive controller 64 may adjust the left acceleration rate for the left drive system 48 and the right acceleration rate for the right drive system 50 based on the user defined propulsion gain preference when controlling the differential drive system 46 to achieve the desired vehicle speed command. The step of adjusting the left acceleration rate and the right acceleration rate based on the user defined propulsion gain preference is generally indicated by box 132 shown in FIG. 3.

Once the drive controller 64 has defined the left acceleration rate for the left drive system 48 and the right acceleration rate for the right drive system 50, and optionally adjusted each based on the user defined turn gain preference and/or the user defined propulsion gain preference, the drive controller 64 may then generate and communicate the left control signal to the left hydraulic drive system commanding the left acceleration rate, and the right control signal to the right drive system 50. The step of controlling the left drive system 48 and the right drive system 50 is generally indicated by box 134 shown in FIG. 3. The control signal may include, but is not limited to, an electrical signal that controls, either directly or indirectly, the left motor and the right motor respectively, as is understood by those skilled in the art.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. An implement comprising:

a steering input operable to receive a desired vehicle steering command;

a differential drive system having a left drive system operable to rotate a left ground engaging element at a first rotational speed, and a right drive system operable to rotate a right ground engaging element at a second rotational speed;

a steering input acceleration sensor operable to detect data related to an acceleration rate of the steering input;

a drive controller including a processor and a memory having a drive control algorithm stored thereon, wherein the processor is operable to execute the drive control algorithm to:

determine an acceleration rate of the steering input while receiving the desired vehicle steering command, from data detected by the steering input acceleration sensor;

define a left acceleration rate for the left drive system to change a velocity of the left ground engaging element from an initial left-side velocity to a commanded left-side velocity for achieving the desired vehicle steering command, wherein the left acceleration rate is defined based on the acceleration rate of the steering input while receiving the desired vehicle steering command;

define a right acceleration rate for the right drive system to change a velocity of the right ground engaging element from an initial right-side velocity to a commanded right-side velocity for achieving the desired vehicle steering command, wherein the right acceleration rate is defined based on the acceleration rate of the steering input while receiving the desired vehicle steering command;

communicate a left control signal to the left drive system commanding the left acceleration rate for controlling the left drive system; and communicate a right control signal to the right drive system commanding the right acceleration rate for controlling the right drive system.

2. The implement set forth in claim 1, wherein the left drive system includes a left pump and a left variable hydraulic motor, and wherein the right drive system includes a right pump and a right variable hydraulic motor.

3. The implement set forth in claim 2, wherein the left pump includes a variable pump, and wherein the right pump includes a variable pump.

4. The implement set forth in claim 1, wherein the left acceleration rate for the left drive system and the right acceleration rate for the right drive system change in a direct relationship relative to the acceleration rate of the steering input.

5. The implement set forth in claim 1, wherein the processor is operable to execute the drive control algorithm to receive a user defined turn gain preference.

6. The implement set forth in claim 5, wherein the processor is operable to execute the drive control algorithm to adjust the left acceleration rate for the left drive system and adjust the right acceleration rate for the right drive system based on the user defined turn gain preference when controlling the differential drive system to achieve the desired vehicle turn command.

7. The implement set forth in claim 1, further comprising a propulsion input operable to receive a desired vehicle speed command, and a propulsion input acceleration sensor operable to detect data related to an acceleration rate of the propulsion input.

8. The implement set forth in claim 7, wherein the processor is operable to execute the drive control algorithm to:

determine an acceleration rate of the propulsion input while receiving the desired vehicle speed command, from data detected by the propulsion input acceleration sensor;

define the left acceleration rate for the left drive system to change the velocity of the left ground engaging element from the initial left-side velocity to the commanded left-side velocity for achieving the desired vehicle speed command, wherein the left acceleration rate is defined based on the acceleration rate of the propulsion input while receiving the desired vehicle speed command;

define the right acceleration rate for the right drive system to change the velocity of the right ground engaging element from the initial right-side velocity to the commanded right-side velocity for achieving the desired vehicle speed command, wherein the right acceleration rate is defined based on the acceleration rate of the propulsion input while receiving the desired vehicle speed command.

9. The implement set forth in claim 8, wherein the left acceleration rate for the left drive system and the right acceleration rate for the right drive system change in a direct relationship relative to the acceleration rate of the propulsion input.

10. The implement set forth in claim 8, wherein the processor is operable to execute the drive control algorithm to receive a user defined propulsion gain preference.

11. The implement set forth in claim 10, wherein the processor is operable to execute the drive control algorithm to adjust the left acceleration rate for the left drive system and adjust the right acceleration rate for the right drive system based on the user defined propulsion gain preference when controlling the differential drive system to achieve the desired vehicle speed command.

12. A self-propelled windrower implement comprising:

a steering input operable to receive a desired vehicle steering command;

a propulsion input operable to receive a desired vehicle speed command;

a differential hydraulic drive system having a left hydraulic drive system operable to rotate a left ground engaging element at a first rotational speed, and a right hydraulic drive system operable to rotate a right ground engaging element at a second rotational speed;

a steering input acceleration sensor operable to detect data related to an acceleration rate of the steering input;

a propulsion input acceleration sensor operable to detect data related to an acceleration rate of the propulsion input;

a drive controller including a processor and a memory having a drive control algorithm stored thereon, wherein the processor is operable to execute the drive control algorithm to:

determine an acceleration rate of the steering input while receiving the desired vehicle steering command, from data detected by the steering input acceleration sensor;

determine an acceleration rate of the propulsion input while receiving the desired vehicle speed command, from data detected by the propulsion input acceleration sensor;

define a left acceleration rate for the left hydraulic drive system to change a velocity of the left ground engaging element from an initial left-side velocity to a commanded left-side velocity for achieving one of the desired vehicle steering command or the desired vehicle speed command, wherein the left acceleration rate is defined based on one of the acceleration rate of the steering input while receiving the desired vehicle steering command or the acceleration rate of the propulsion input while receiving the desired vehicle speed command;

define a right acceleration rate for the right hydraulic drive system to change a velocity of the right ground engaging element from an initial right-side velocity to a commanded right-side velocity for achieving one of the desired vehicle steering command or the desired vehicle speed command, wherein the right acceleration rate is defined based on one of the acceleration rate of the steering input while receiving the desired vehicle steering command or the acceleration rate of the propulsion input while receiving the desired vehicle speed command;

communicate a left control signal to the left hydraulic drive system commanding the left acceleration rate; and communicate a right control signal to the right hydraulic drive system commanding the right acceleration rate.

13. The self-propelled windrower implement set forth in claim 12, wherein the left hydraulic drive system includes a left variable pump and a left variable hydraulic motor, and wherein the right hydraulic drive system includes a right variable pump and a right variable hydraulic motor.

14. The self-propelled windrower implement set forth in claim 12, wherein the left acceleration rate for the left hydraulic drive system and the right acceleration rate for the right hydraulic drive system change in a direct relationship relative to the acceleration rate of the steering input, and wherein the left acceleration rate for the left hydraulic drive system and the right acceleration rate for the right hydraulic drive system change in a direct relationship relative to the acceleration rate of the propulsion input.

15. The self-propelled windrower implement set forth in claim 12, wherein the processor is operable to execute the drive control algorithm to define the left acceleration rate for the left hydraulic drive system and the right acceleration rate for the right hydraulic drive system to each be between a minimum allowable acceleration rate and a maximum allowable acceleration rate.

16. The self-propelled windrower implement set forth in claim 12, wherein the processor is operable to execute the drive control algorithm to receive a user defined turn gain preference, and adjust the left acceleration rate for the left hydraulic drive system and adjust the right acceleration rate for the right hydraulic drive system based on the user defined turn gain preference when controlling the differential hydraulic drive system to achieve the desired vehicle turn command.

17. The self-propelled windrower implement set forth in claim 12, wherein the processor is operable to execute the drive control algorithm to receive a user defined propulsion gain preference, and adjust the left acceleration rate for the left hydraulic drive system and adjust the right acceleration rate for the right hydraulic drive system based on the user defined propulsion gain preference when controlling the differential hydraulic drive system to achieve the desired vehicle speed command.

18. A method of controlling a differential drive system of an implement, the method comprising:

determining, with a drive controller, one of an acceleration rate of a steering input while receiving a desired vehicle steering command, from data detected by a steering input acceleration sensor, or an acceleration rate of a propulsion input while receiving a desired vehicle speed command, from data detected by a propulsion input acceleration sensor;

defining a left acceleration rate for the left drive system, with the drive controller, to change a velocity of a left ground engaging element from an initial left-side velocity to a commanded left-side velocity for achieving one of the desired vehicle steering command or the desired vehicle speed command, wherein the left acceleration rate is defined based on one of the acceleration rate of the steering input while receiving the desired vehicle steering command or the acceleration rate of the propulsion input while receiving the desired vehicle speed command;

defining a right acceleration rate for the right drive system, with the drive controller, to change a velocity of a right ground engaging element from an initial right-side velocity to a commanded right-side velocity for achieving one of the desired vehicle steering command or the desired vehicle speed command, wherein the right acceleration rate is defined based on one of the acceleration rate of the steering input while receiving the desired vehicle steering command or the acceleration rate of the propulsion input while receiving the desired vehicle speed command;

communicating a left control signal to the left drive system with the drive controller to command the left acceleration rate; and communicating a right control signal to the right drive system with the drive controller to command the right acceleration rate.

19. The method set forth in claim 18, further comprising:

receiving a user defined turn gain preference; and adjusting the left acceleration rate for the left drive system and adjusting the right acceleration rate for the right drive system based on the user defined turn gain preference when controlling the differential drive system to achieve the desired vehicle turn command.

20. The method set forth in claim 18, further comprising:

receiving a user defined propulsion gain preference; and adjusting the left acceleration rate for the left drive system and adjusting the right acceleration rate for the right drive system based on the user defined propulsion gain preference when controlling the differential drive system to achieve the desired vehicle speed command.

* * * * *